US012573030B2

(12) United States Patent
Legarreta Gorrono et al.

(10) Patent No.: US 12,573,030 B2
(45) Date of Patent: Mar. 10, 2026

(54) PROCESSING OF TRACTOGRAPHY RESULTS USING AN AUTOENCODER

(71) Applicant: Imeka Solutions Inc., Sherbrooke (CA)

(72) Inventors: Jon Haitz Legarreta Gorrono, Sherbrooke (CA); Maxime Descoteaux, Magog (CA); Pierre-Marc Jodoin, Eastman (CA)

(73) Assignee: Imeka Solutions Inc., Sherbrooke (CA)

( * ) Notice: Subject to any disclaimer, the term of this patent is extended or adjusted under 35 U.S.C. 154(b) by 477 days.

(21) Appl. No.: 17/337,413

(22) Filed: Jun. 2, 2021

(65) Prior Publication Data

US 2022/0392058 A1 Dec. 8, 2022

(51) Int. Cl.
G06T 7/00 (2017.01)
G06F 18/2413 (2023.01)
(Continued)

(52) U.S. Cl.
CPC ........ G06T 7/0012 (2013.01); G06F 18/2413 (2023.01); G06T 7/70 (2017.01);
(Continued)

(58) Field of Classification Search
CPC ..................... G06T 7/0012; G06T 7/70; G06T 2207/10092; G06T 2207/20084;
(Continued)

(56) References Cited

U.S. PATENT DOCUMENTS 9,033,167 B1 5/2015 Pineda et al.
10,874,592 B2 12/2020 Pyka
(Continued)

FOREIGN PATENT DOCUMENTS

AU 2020102977 A4 12/2020
CN 110188836 A 8/2019
(Continued)

OTHER PUBLICATIONS

Lui, Meimei et al., Auto-encoding brain networks with applications to analyzing large-scale brain imaging datasets, Nov. 7, 2019 (Year: 2019).*

(Continued)

*Primary Examiner* — Gregory A Morse
*Assistant Examiner* — Stefano Anthony Dardano
(74) *Attorney, Agent, or Firm* — Torrey Pines Law Group PC

(57) ABSTRACT

A computer system that computes second tractography results is described. This computer may include: a computation device (such as a processor, a graphics processing unit or GPU, etc.) that executes program instructions; and memory that stores the program instructions. During operation, the computer system receives information specifying tractography results that specify a set of neurological fibers. Then, the computer system computes, using a predetermined (e.g., pretrained) autoencoder neural network, the second tractography results that specify a second set of neurological fibers based at least in part on the tractography results and information associated with a neurological anatomical region. For example, a subset of the set of neurological fibers may be anatomically implausible and the second set of fibers may exclude the subset. Note that the predetermined autoencoder neural network may be trained using an unsupervised-learning technique.

21 Claims, 16 Drawing Sheets

(51) Int. Cl.
*G06T 7/70* (2017.01)
*G06V 10/75* (2022.01)

(52) U.S. Cl.
CPC .. *G06V 10/754* (2022.01); *G06T 2207/10092* (2013.01); *G06T 2207/20084* (2013.01); *G06T 2207/30016* (2013.01); *G06T 2207/30242* (2013.01)

(58) Field of Classification Search
CPC . G06T 2207/30016; G06T 2207/30242; G06T 7/11; G06T 2207/10081; G06T 2207/10116; G06T 2207/20076; G06T 2207/20081; G06F 18/2413; G06V 10/754; G06V 10/82
See application file for complete search history.

(56) References Cited

U.S. PATENT DOCUMENTS

| | | | | |
|---|---|---|---|---|
| 11,152,123 | B1 * | 10/2021 | Sughrue | G16H 40/67 |
| 2019/0290130 | A1 * | 9/2019 | Zagorchev | G01R 33/4806 |
| 2020/0034948 | A1 * | 1/2020 | Park | G06N 20/20 |
| 2020/0265581 | A1 * | 8/2020 | Prchkovska | G01R 33/5608 |
| 2020/0380687 | A1 * | 12/2020 | Avital | A61B 8/5207 |
| 2021/0343018 | A1 * | 11/2021 | Vigh | G06V 10/26 |
| 2022/0122306 | A1 * | 4/2022 | Lin | G06N 3/0475 |

FOREIGN PATENT DOCUMENTS

| | | | | |
|---|---|---|---|---|
| CN | 110223275 | A | 9/2019 | |
| EP | 3719711 | A2 | 10/2020 | |
| EP | 3734550 | A1 | 11/2020 | |
| KR | 20190112219 | A | 10/2019 | |
| WO | 2020198582 | A1 | 10/2020 | |
| WO | WO-2020207848 | A1 * | 10/2020 | ............ A61B 5/055 |

OTHER PUBLICATIONS

Huerta, Isaías, et al. "Inter-subject clustering of brain fibers from whole-brain tractography." 2020 42nd Annual International Conference of the IEEE Engineering in Medicine & Biology Society (EMBC). IEEE, 2020. (Year: 2020).*

Yu, Jianbo, Xing Liu, and Lyujiangnan Ye. "Convolutional long short-term memory autoencoder-based feature learning for fault detection in industrial processes." IEEE Transactions on Instrumentation and Measurement 70 (2020): 1-15. (Year: 2020).*

Early Diagnosis of Alzheimer's Disease: a Multi-Class Deep Learning Framework With Modified K-Sparse Autoencoder Classification, Bhatkoti, P., Paul, M. IN2016 International Conference on Image and Vision Computing New Zealand (IVCNZ) Nov. 2, 20161 (pp. 1-5).

Tractography Filtering Using Autoencoders, Legarreta. J, H., et al., preprint from Imeka, Oct. 7, 2020.

* cited by examiner

200

RECEIVE INFORMATION SPECIFYING
TRACTOGRAPHY RESULTS
210

COMPUTE SECOND TRACTOGRAPHY
RESULTS
212

PERFORM ONE OR MORE ADDITIONAL
OPERATIONS
214

TRAINING (PHASE 2): ENCODE A NOISY TRACTOGRAM

LATENT SPACE

TRAINING (PHASE 3): DETERMINE WHICH LATENT VECTOR IS
CLOSE TO A REFERENCE TRACTOGRAM

LATENT SPACE

TESTING (PHASE 2): ENCODE A NOISY TRACTOGRAM

LATENT SPACE

FIG. 13

TESTING (PHASE 3): DETERMINE WHICH LATENT VECTOR IS
CLOSE TO A REFERENCE TRACTOGRAM

LATENT SPACE

COMPUTER
1600

PROCESSING OF TRACTOGRAPHY RESULTS USING AN AUTOENCODER

FIELD

The described embodiments relate to processing of medical images. Notably, the described embodiments relate to a processing tractography results using an autoencoder and, more generally, using a neural network.

BACKGROUND

Tractography uses local orientation information from diffusion magnetic resonance imaging (dMRI) data to delineate brain white matter fiber pathways, and thus, to provide information about its structural connectivity. These connectivity pathways in tractograms are composed of streamlines virtually representing fascicles of white matter fibers. Note that the quality of the tractograms influence various aspects of connectome analysis, including: the connectivity density, the clustering degree or the existence of connections themselves, among others.

Existing tractography techniques typically face a number of challenges when propagating streamlines. For example, existing tractography techniques often have difficulty: avoiding the early termination of the tracking procedure; providing streamlines between gray matter regions that are known to be connected while avoiding spurious streamlines; ensuring the full occupancy of the white matter volume by the streamlines; and providing a complete gray matter surface coverage when streamlines reach the cortex.

Consequently, and despite the ongoing efforts to address these issues, white matter tracking techniques are often known to produce a disproportionately large number of invalid streamlines (which are sometimes referred to as 'implausible streamlines'). The category of invalid streamlines spans a broad group of streamlines that violate accepted neuroanatomical constraints attributed to fiber populations. These include streamlines that contain loops or sharp bends; streamlines that stop in non-gray matter tissues, such as the cerebrospinal fluid (CSF); streamlines that prematurely stop in the white matter; or streamlines describing trajectories between gray matter regions that are not connected structurally. Indeed, recent work indicates that, as a trade-off between sensitivity and specificity, existing tractography techniques produce a non-negligible proportion of invalid or non-existing, false-positive streamlines or connections.

To address these problems, many existing tractography techniques use filtering to detect and remove anatomically implausible streamlines, and to mitigate some of the limitations derived from current streamline propagation techniques. Notably, existing diffusion MRI tractography techniques generate tractograms that may contain several million candidate streamlines representing white matter fiber populations. However, a regular tractogram including only anatomically plausible streamlines can contain in the order of 500,000 to 3,000,000 streamlines. Automatic tractography filtering of the implausible streamlines is currently based on one or more factors, including: streamline geometry features; region-of-interest-driven streamline inclusion and exclusion; clustering (which is sometimes referred to as 'bundling'); connectivity-based; and/or diffusion signal mapping or forward models.

These existing filtering approaches typically involve one or more assumptions, such as an assumed constraint. For example, invalid streamlines may be identified and removed based on: an unfeasible streamline length (and, more generally, neuroanatomical constraints); local curvature indices; streamline inclusion and exclusion criteria; and/or white matter and/or tissue local and connectivity constraints for streamline traversal. Alternatively, in clustering approaches, a similarity measure (e.g., based on assumed defined distance measure) is used to remove non-meaningful data. Moreover, in connectivity-based approaches, undesired streamlines are usually removed by imposing a regularization constraint on the tractogram-derived connectivity matrices. Furthermore, forward models often identify a subset of streamlines to be preserved in a whole-brain tractogram by, e.g., modifying a local fiber orientation distribution function (fODF) based on the diffusion signal or using local models to weigh the contribution of the diffusion signal to the streamline representation.

In principle, streamline filtering can be seen as an application of choice for deep learning classification techniques. However, neural networks are usually not easily applied to brain tractography, e.g., because of the difficulty in building a labeled dataset for use in supervised training. Indeed, finding irreproachable ground truth streamlines is typically a very difficult endeavor, with significant differences in reproducibility measures even among well-trained expert neuroanatomists. Moreover, depending on the task at hand, the labeling of the streamlines often vary considerably, and thus may require time-consuming manual verification and/or relabeling. Additionally, because existing neural network approaches are trained using supervised-learning techniques, the resulting neural networks either have a fixed number of target classes (such as a fixed number of cluster types or bundles of anatomically coherent streamlines) or use distinctly trained neural networks or models for corresponding types of clusters. Hence, regular classification neural networks are trained to predict a fixed number of classes, and thus cannot be used to predict a different set of classes without being retrained on a newly labeled set of data. These limitations constrain the flexibility of the analysis, and result in additional complexity and computational overhead, or suffer from trade-offs between accuracy and computational efficiency based on the bundle granularity.

SUMMARY

A computer system that computes second tractography results is described. This computer may include: a computation device (such as a processor, a graphics processing unit or GPU, etc.) that executes program instructions; and memory that stores the program instructions. During operation, the computer system receives information specifying tractography results that specify a set of neurological fibers. Then, the computer system computes, using a predetermined (e.g., pretrained) autoencoder neural network, the second tractography results that specify a second set of neurological fibers based at least in part on the tractography results and information associated with a neurological anatomical region.

Note that the predetermined autoencoder neural network may be trained using an unsupervised-learning technique.

Moreover, the tractography results may be associated with magnetic-resonance images of one or more individuals.

Furthermore, a subset of the set of neurological fibers may be anatomically implausible and the second set of fibers may exclude the subset.

Additionally, the second set of neurological fibers may, at least in part, be different from the set of neurological fibers.

In some embodiments, the receiving may include accessing the information in the memory.

Note that the predetermined auto-encoded neural network may identify different types of bundles of neurological fibers, where the different types of bundles of neurological fibers include different integer numbers of neurological fibers. Moreover, the identifying may include: discarding one or more neurological fibers in the set of neurological fibers; or classifying the one or more neurological fibers as a given type of bundle of neurological fibers that includes an integer number of neurological fibers.

Furthermore, the computing may include filtering and grouping (which, in the discussion that follows, is sometimes referred to as 'bundling') the second set of neurological fibers from the set of neurological fibers based at least in part on the information associated with the neurological anatomical region. For example, the filtering may include classifying one or more neurological fibers as a type of bundle of neurological fibers comprising an integer number of neurological fibers.

Additionally, the computing may include: transforming the set of neurological fibers to a latent space having a smaller number of dimensions than the set of neurological fibers; and classifying one or more neurological fibers as a type of bundle of neurological fibers that includes an integer number of neurological fibers based at least in part on a classification technique and a reference space encoded in the latent space that corresponds to the information associated with the neurological anatomical region. Note that the reference space may specify different types of bundles of neurological fibers that include different integer numbers of neurological fibers. Moreover, the classification technique may include: a K nearest-neighbors technique, where K is a non-zero integer; a generative model; a Fisher discriminator; a kernel method; a decision tree; a random forest; a linear perceptron; and/or a multi-layer neural network. In some embodiments, the computer system may: sample the latent space based at least in part on a sampling technique; and generate neurological fibers in the second set of neurological fibers based at least in part on the sampled latent space.

Furthermore, the predetermined autoencoder neural network may include an encoder neural network and a decoder neural network, where a given neural network in the predetermined autoencoder neural network may include one or more convolutional layers, one or more residual layers and one or more dense layers. Additionally, a given node in a given layer in the given neural network may include an activation function that includes: a rectified linear activation function (ReLU), a leaky ReLU, an exponential linear unit (ELU) activation function, a parametric ReLU, a tan h activation function, and/or a sigmoid activation function.

Another embodiment provides a computer for use, e.g., in the computer system.

Another embodiment provides a computer-readable storage medium for use with the computer or the computer system. When executed by the computer or the computer system, this computer-readable storage medium causes computer or the computer system to perform at least some of the aforementioned operations.

Another embodiment provides a method, which may be performed by the computer or the computer system. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

FIGS. 8-14 are drawings illustrating examples of a cleaning and bundling operation in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Figure 1:
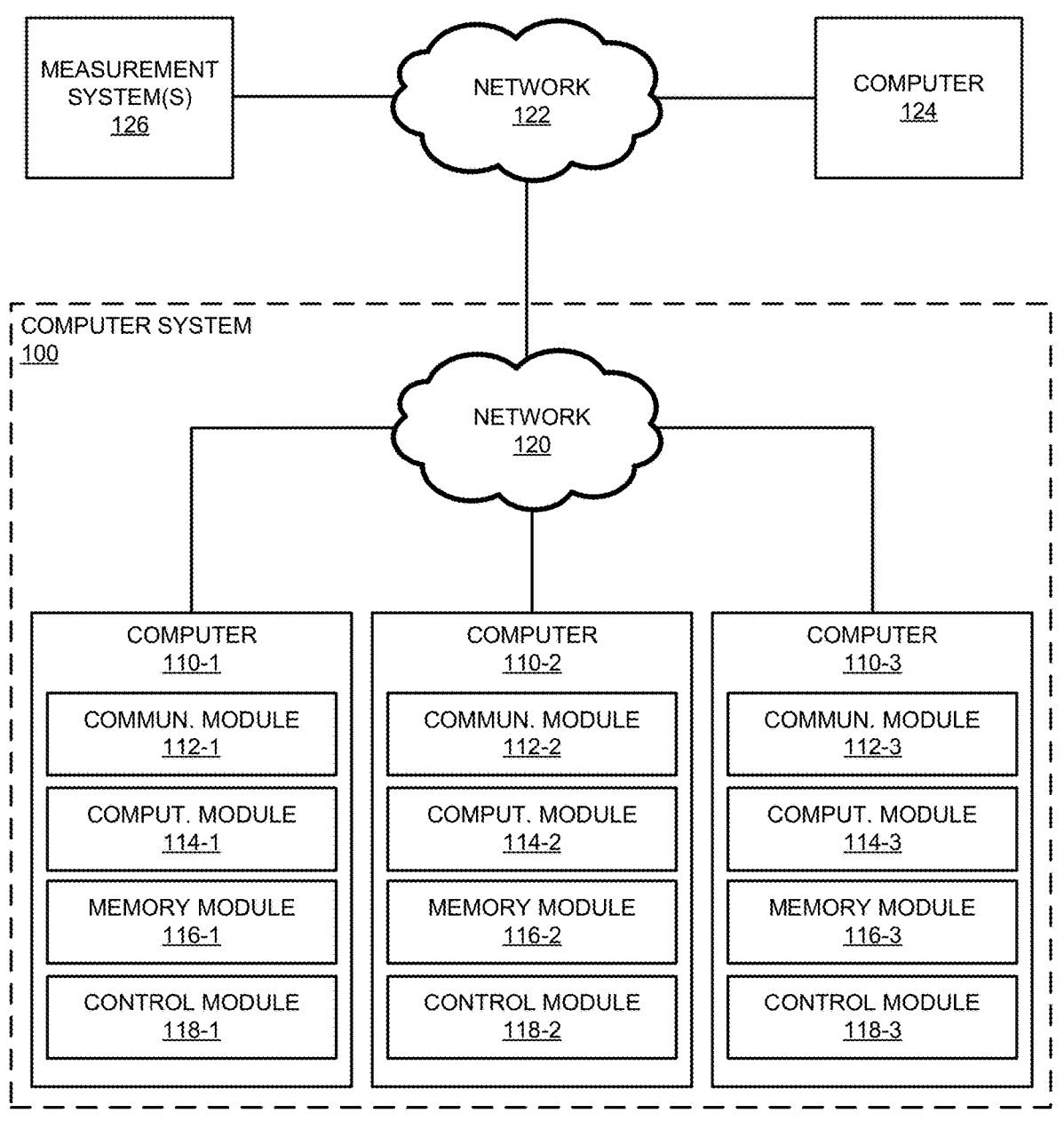
FIG. 1 is a block diagram illustrating an example of a computer system in accordance with an embodiment of the present disclosure.

A computer system that computes second tractography results is described. This computer may include: a computation device (such as a processor, a graphics processing unit or GPU, etc.) that executes program instructions; and memory that stores the program instructions. During operation, the computer system receives information specifying tractography results (which are sometimes referred to as 'tractograms') that specify a set of neurological fibers. Then, the computer system computes, using a predetermined (e.g., pretrained) autoencoder neural network, the second tractography results that specify a second set of neurological fibers based at least in part on the tractography results and information associated with a neurological anatomical region. For example, a subset of the set of neurological fibers may be anatomically implausible and the second set of fibers may exclude the subset. Note that the predetermined autoencoder neural network may be trained using an unsupervised-learning technique.

By computing the second tractography results, these analysis techniques may address the problems associated with existing brain white matter fiber tracking techniques. Notably, the analysis techniques may generate large proportions of streamlines that accurately describe the underlying anatomy; extract streamlines that are supported by the underlying signal (such as a diffusion MRI signal); and/or correctly representing different neurological fiber populations. Moreover, the analysis techniques may filter and group the second set of neurological fibers from the set of neurological fibers (e.g., into types of clusters or bundles that include different numbers of neurological fibers) based at least in part on the information associated with the neurological anatomical region. In the process, the analysis techniques may improve the accuracy of the second tractography results and the groupings (e.g., by providing an improved trade-off between sensitivity and specificity). Furthermore, these capabilities may improve the quality and accuracy of connectome analysis that leverages the second tractography results. In addition, the analysis techniques may significantly reduce the computation time needed to obtain the second tractography result relative to existing analysis techniques (e.g., by 10×), thereby reducing the use of processor, memory and communication resources in or associated with the computer system.

In the discussion that follows, the analysis techniques are used to analyze dMRI data. However, the analysis techniques may be used to analyze a wide variety of types of magnetic-resonance images (which may or may not involve MRI, e.g., free-induction-decay measurements), such as: magnetic resonance spectroscopy (MRS) with one or more types of nuclei, magnetic resonance spectral imaging (MRSI), magnetic resonance elastography (MRE), magnetic resonance thermometry (MRT), magnetic-field relaxometry and/or another magnetic resonance technique (e.g., functional MM, metabolic imaging, molecular imaging, blood-flow imaging, diffusion-tensor imaging, etc.). More generally (and provided that the result neurological fibers are in the same reference as the analyzed images) the analysis techniques may be used to analyze measurement results from a wide variety of invasive and non-invasive imaging techniques, such as: X-ray measurements (such as X-ray imaging, X-ray diffraction or computed tomography at one or more wavelengths between 0.01 and 10 nm), neutron measurements (neutron diffraction), electron measurements (such as electron microscopy or electron spin resonance), optical measurements (such as optical imaging or optical spectroscopy that determines a complex index of refraction at one or more visible wavelengths between 300 and 800 nm or ultraviolet wavelengths between 10 and 400 nm), infrared measurements (such as infrared imaging or infrared spectroscopy that determines a complex index of refraction at one or more wavelengths between 700 nm and 1 mm), ultrasound measurements (such as ultrasound imaging in an ultrasound band of wavelengths between 0.2 and 1.9 mm), proton measurements (such as proton scattering), positron emission spectroscopy, impedance measurements (such as electrical impedance at DC and/or an AC frequency) and/or susceptibility measurements (such as magnetic susceptibility at DC and/or an AC frequency).

We now describe embodiments of the analysis techniques. Notably, in the discussion that follows a deep autoencoder for streamline-based tractography filtering (which is sometimes referred to as 'filtering in tractography using autoencoders' or FINTA) is described. In FINTA, the autoencoder may be trained on non-curated, raw tractograms (i.e., in an unsupervised fashion or using an unsupervised-learning technique), and a filtering threshold may be computed in the learned representation space using a set of labeled streamlines. Once training is over, the learned latent space may be a low-dimensional robust representation of the input streamlines, where similar streamlines are located next to each other. The filtering of plausible and implausible streamlines may then be carried out by projecting to the latent space examples of reference streamlines. Moreover, the to-befiltered streamlines may be projected to the latent space and labeled according to a classification technique (e.g., a K nearest-neighbors technique, where K is a non-zero integer; a generative model; a Fisher discriminator; a kernel method; a decision tree; a random forest; a boosting technique; a linear perceptron; and/or a multi-layer neural network). FINTA may provide superior performance (e.g., more accurate tractograms, such as an accuracy greater than 80 or 90%; a sensitivity of greater than 80 or 90%; a precision greater than 70 or 78%; and an F1-score of greater than 70 or 80%) relative to existing tractography techniques. In addition, FINTA may be linear in terms of the streamline count at test time, thereby providing faster tractogram filtering (i.e., faster analysis).

FIG. 1 presents a block diagram illustrating an example of a computer system 100. This computer system may include one or more computers 110. These computers may include: communication modules 112, computation modules 114, memory modules 116, and optional control modules 118. Note that a given module or engine may be implemented in hardware and/or in software.

Communication modules 112 may communicate frames or packets with data or information (such as measurement results or control instructions) between computers 110 via a network 120 (such as the Internet and/or an intranet). For example, this communication may use a wired communication protocol, such as an Institute of Electrical and Electronics Engineers (IEEE) 802.3 standard (which is sometimes referred to as 'Ethernet') and/or another type of wired interface. Alternatively or additionally, communication modules 112 may communicate the data or the information using a wireless communication protocol, such as: an IEEE 802.11 standard (which is sometimes referred to as 'Wi-Fi', from the Wi-Fi Alliance of Austin, Texas), Bluetooth (from the Bluetooth Special Interest Group of Kirkland, Washington), a third generation or 3G communication protocol, a fourth generation or 4G communication protocol, e.g., Long Term Evolution or LTE (from the 3rd Generation Partnership Project of Sophia Antipolis, Valbonne, France), LTE Advanced (LTE-A), a fifth generation or 5G communication protocol, other present or future developed advanced cellular communication protocol, or another type of wireless interface. For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies.

In the described embodiments, processing a packet or a frame in a given one of computers 110 (such as computer 110-1) may include: receiving the signals with a packet or the frame; decoding/extracting the packet or the frame from the received signals to acquire the packet or the frame; and processing the packet or the frame to determine information contained in the payload of the packet or the frame. Note that the communication in FIG. 1 may be characterized by a variety of performance metrics, such as: a data rate for successful communication (which is sometimes referred to as 'throughput'), an error rate (such as a retry or resend rate), a mean squared error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). Note that wireless communication between components in FIG. 1 uses one or more bands of frequencies, such as: 900 MHz, 2.4 GHz, 5 GHz, 6 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. In some embodiments, the communication between the components may use multi-user transmission (such as orthogonal frequency division multiple access or OFDMA).

Moreover, computation modules 114 may perform calculations using: one or more microprocessors, ASICs, micro-controllers, programmable-logic devices, GPUs and/or one or more digital signal processors (DSPs). Note that a given computation component is sometimes referred to as a 'computation device'.

Furthermore, memory modules 116 may access stored data or information in memory that local in computer system 100 and/or that is remotely located from computer system 100. Notably, in some embodiments, one or more of memory modules 116 may access stored measurement results in the local memory, such as dMRI data for one individual or one or more individuals (which, for multiple individuals, may include cases and controls or disease and healthy populations). Alternatively or additionally, in other embodiments, one or more memory modules 116 may access, via one or more of communication modules 112, stored measurement results in the remote memory in computer 124, e.g., via network 120 and network 122. Note that network 122 may include: the Internet and/or an intranet. In some embodiments, the measurement results are received from one or more measurement systems 126 (such as MRI scanners) via network 120 and network 122 and one or more of communication modules 112. Thus, in some embodiments at least some of the measurement results may have been received previously and may be stored in memory, while in other embodiments at least some of the measurement results may be received in real-time from the one or more measurement systems 126.

While FIG. 1 illustrates computer system 100 at a particular location, in other embodiments at least a portion of computer system 100 is implemented at more than one location. Thus, in some embodiments, computer system 100 is implemented in a centralized manner, while in other embodiments at least a portion of computer system 100 is implemented in a distributed manner. For example, in some embodiments, the one or more measurement systems 126 may include local hardware and/or software that performs at least some of the operations in the analysis techniques. This remote processing may reduce the amount of data that is communicated via network 120 and network 122. In addition, the remote processing may anonymize the measurement results that are communicated to and analyzed by computer system 100. This capability may help ensure computer system 100 is compatible and compliant with regulations, such as the Health Insurance Portability and Accountability Act, e.g., by removing or obfuscating protected health information in the measurement results.

Although we describe the computation environment shown in FIG. 1 as an example, in alternative embodiments, different numbers or types of components may be present in computer system 100. For example, some embodiments may include more or fewer components, a different component, and/or components may be combined into a single component, and/or a single component may be divided into two or more components.

As discussed previously, existing tractography techniques often suffer from a number of problems. Moreover, as described further below with reference to FIGS. 2-15, in order to address these challenges computer system 100 may perform the analysis techniques. Notably, during the analysis techniques, one or more of optional control modules 118 may divide the analysis among computers 110. Then, a given computer (such as computer 110-1) may perform at least a designated portion of the analysis. Notably, computation module 114-1 may access information (e.g., using memory module 116-1) specifying tractography results that specify a set of neurological fibers, which are sometimes referred to as 'neural tracts' or 'streamlines'. (In the present discussion, note that a 'neurological fiber' includes a sequence of three dimensional or 3D points that are connected together.) Notably, the tractography results may include or may correspond to dMRI data. In some embodiments, the tractography results may be performed on an output of one or more preceding stages or operations in an analysis pipeline. For example, as described further below with reference to FIG. 7, the analysis pipeline may include: quality control or QC (such as visual inspection, an image resolution check and/or a gradient distribution check), skull stripping or SS, preprocessing or PP (such as denoising, motion correction and/or a correction for magnetic field inhomogeneity), harmonization (to correct for data variation, e.g., in dMRI and/or MRI data, associated with different MR scanners), tissue segmentation (e.g., white matter, grey matter, tumor, cerebrospinal fluid, etc., and which may be based at least in part on structural MRI data using a convolutional neural network).

Then, computation module 114-1 may compute, using a predetermined (e.g., pretrained) autoencoder neural network, second tractography results that specify a second set of neurological fibers based at least in part on the tractography results and information associated with a neurological anatomical region. Note that a subset of the set of neurological fibers may be anatomically implausible and the second set of fibers may exclude the subset. Moreover, the predetermined autoencoder neural network may be trained using an unsupervised-learning technique. In some embodiments, the second set of neurological fibers may, at least in part, be different from the set of neurological fibers. Note that computing the second tractography results may include a cleaning and bundling operation in which the neurological fibers are grouped or bundled into different types of bundles of neurological fibers having different numbers of neurological fibers. In some embodiments, the second tractography results may be input to one or more subsequent stages or operations in the analysis pipeline, such as: statistical analysis, connectome analysis, population analysis, etc.

In some embodiments, the autoencoder neural network may include an encoder neural network (which may be variational or not) and a decoder neural network. The output of the encoder neural network may be a so-called 'latent space'. The autoencoder neural network may have been trained on a set of neurological fibers obtained by a tractography technique on MRIs associated with one or more brains. These MRIs may be optionally registered onto a reference space (such as or similar to the Montreal Neurological Institute or MNI space). Then, the neurological fibers of a reference bundle may be input to the encoder neural network and projected into the latent space. In this way, each neurological fiber may be encoded as a 'latent vector' lying in the latent space. These latent vectors may be defined as a set A. Next, given one or more MRIs of another individual (which may or may not be registered), the tractography technique may be used to recover an associated tractogram (e.g., a set of neurological fibers). The neurological fibers in this tractogram are then input to the encoder neural network and converted into second latent vectors. These second latent vectors may be defined as a set B. Moreover, a classification technique (such as a K nearest-neighbors technique, where K is a non-zero integer; a generative model; a Fisher discriminator; a kernel method; a decision tree; a random forest; a boosting technique, a linear perceptron; and/or a multi-layer neural network) may compare set A and set B. The latent vectors in set B that are close (in a hyperdimensional latent space) to at least one latent vector in set A may be kept (i.e., included in the second tractography results), and the remaining latent vectors may be excluded or eliminated.

In these ways, computer system 100 may automatically and accurately perform filtering and/or grouping or bundling of the neurological fibers. These capabilities may allow the second tractography results to be used in subsequent analyses or one or more additional operations, such as: connectome analysis, white matter segmentation, one or more clinical trial enrollment or exclusion criteria, assessing the impact of a medical intervention for a disease (e.g., in a clinical trial for a candidate pharmaceutical agent, neurostimulation and/or another type of therapy), precision medicine (such as in selecting a correct medical intervention to treat a disease, e.g., as a companion diagnostic for a prescription drug or a dose of a prescription drug), etc. For example, the more-accurate tractography results may allow more accurate determination of: an axon density index, radial diffusion, volume, a myelin index or metric, an inflammation index or metric, fractional anisotropy, free water, apparent fiber density, a microglia index or metric, an astrocyte index or metric, an oligodendrocyte index or metric, a lesion edema index or metric, a cerebrospinal fluid index or metric and/or, more generally, a characteristic or attribute associated with microstructure environment (e.g., on a sub-millimeter length scale that is less than a length scale corresponding to a voxel) of one or more neurological fibers in particular neurological anatomic regions. Note that the disease may include: Parkinson's, Alzheimer's, Lou Gehrig's disease, multiple sclerosis, amyotrophic lateral sclerosis, normal pressure hydrocephalus, concussion, migraine, epilepsy, a type of cancer, an autoimmune disease, schizophrenia, depression, bipolar disorder, another type of mental illness, a neurodegenerative disease, a neuroinflammatory disease, or another type of neurological disease of the central nervous system. Consequently, the analysis techniques may facilitate accurate, value-added use of the measurement results.

Figure 2:
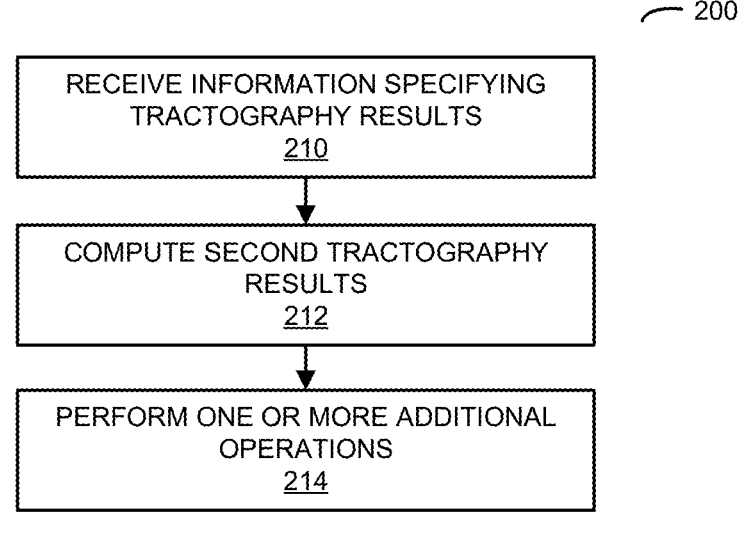
FIG. 2 is a flow diagram illustrating an example of a method for computing second tractography results using a computer system in FIG. 1 in accordance with an embodiment of the present disclosure.

We now describe embodiments of the method. FIG. 2 presents a flow diagram illustrating an example of a method 200 for computing second tractography results, which may be performed by a computer system (such as computer system 100 in FIG. 1). During operation, the computer system may receive information specifying tractography results (operation 210) that specify a set of neurological fibers. For example, the receiving may include accessing the information in memory. Note that the tractography results may be associated with magnetic-resonance images of one or more individuals, including: T1-weighted, T2 T1-weighted, PD, FLAIR, b-value images, diffusion weighted images, diffusion tensor images, high angular resolution diffusion images, and/or another type of magnetic-resonance image or data.

Then, the computer system may compute, using a predetermined autoencoder neural network, the second tractography results (operation 212) that specify a second set of neurological fibers based at least in part on the tractography results and information associated with a neurological anatomical region. Note that the predetermined autoencoder neural network may be trained using an unsupervised-learning technique. Moreover, a subset of the set of neurological fibers may be anatomically implausible and the second set of fibers may exclude the subset. For example, a latent space provided by the autoencoder may distinguish anatomically plausible and anatomically implausible neurological fibers. Furthermore, the second set of neurological fibers may, at least in part, be different from the set of neurological fibers.

In some embodiments, the computer system may optionally perform one or more additional operations (operation 214). For example, the predetermined auto-encoded neural network may identify different types of bundles of neurological fibers, where the different types of bundles of neurological fibers include different integer numbers of neurological fibers. Moreover, the identifying may include: discarding one or more neurological fibers in the set of neurological fibers; or classifying the one or more neurological fibers as a given type of bundle of neurological fibers that includes an integer number of neurological fibers.

Furthermore, the computing (operation 212) may include filtering and grouping the second set of neurological fibers from the set of neurological fibers based at least in part on the information associated with the neurological anatomical region. For example, the filtering may include classifying one or more neurological fibers as a type of bundle of neurological fibers comprising an integer number of neurological fibers.

Additionally, the computing (operation 212) may include: transforming (e.g., using the predetermined autoencoder) the set of neurological fibers to a latent space having a smaller number of dimensions than the set of neurological fibers; and classifying one or more neurological fibers as a type of bundle of neurological fibers that includes an integer number of neurological fibers based at least in part on a classification technique and a reference space encoded (e.g., by the predetermined autoencoder neural network) in the latent space that corresponds to the information associated with the neurological anatomical region. Note that the reference space may specify different types of bundles of neurological fibers that include different integer numbers of neurological fibers. Moreover, the classification technique may include: a K nearest-neighbors technique, where K is a non-zero integer; a generative model; a Fisher discriminator; a kernel method; a decision tree; a random forest; a boosting technique, a linear perceptron; and/or a multi-layer neural network (such as a classification neural network, e.g., one or more convolutional layers, one or more residual layers and/or one or more dense layer and/or one or more fully connected layers, which include a softmax activation function that generates an output).

In some embodiments, the computer system may sample the latent space based at least in part on a sampling technique; and generate neurological fibers in the second set of neurological fibers based at least in part on the sampled latent space. For example, the sampling technique may include: rejection sampling, a Metropolis-Hastings technique, Gibbs sampling, etc. This sampling technique may blindly sample the latent space or may be guided by a reference space or set of latent vectors. Note that the sampled latent space may result in new latent vectors, which may be input to the decoder neural network to generate new neurological fibers. These new neurological fibers may be included in or used to populate a preexisting tractogram.

Furthermore, the predetermined autoencoder neural network may include an encoder neural network (which may be variational or non-variational) and a decoder neural network, where a given neural network in the predetermined autoencoder neural network may include or combine one or more convolutional layers, one or more residual layers and one or more dense or fully connected layers. Additionally, a given node in a given layer in the given neural network may include an activation function that includes: a ReLU, a leaky ReLU, an ELU activation function, a parametric ReLU, a tan h activation function, a sigmoid activation function, and/or another type of activation function. Note that an output of the given neural network may or may not include an activation function, such as: a tan h activation function, a sigmoid activation function, an identity function, and/or another type of activation function.

In some embodiments of method 200, there may be additional or fewer operations. Furthermore, the order of the operations may be changed, and/or two or more operations may be combined into a single operation.

Figure 3:
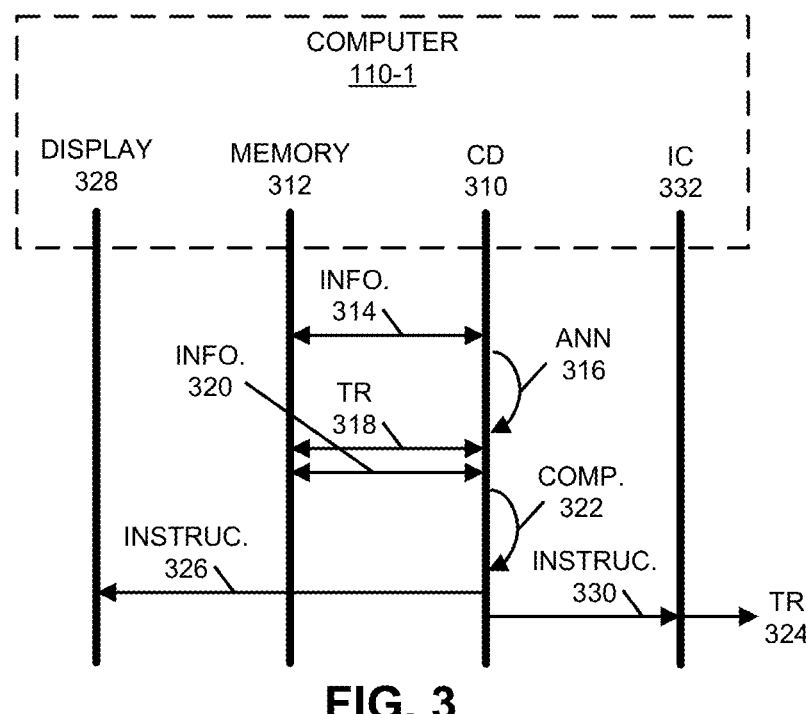
FIG. 3 is a drawing illustrating an example of communication between components in a computer system in FIG. 1 in accordance with an embodiment of the present disclosure.

Embodiments of the analysis techniques are further illustrated in FIG. 3, which presents a drawing illustrating an example of communication among components in computer system 100. In FIG. 3, a computation device (CD) 310 (such as a processor or a GPU) in computer 110-1 may access in memory 312 in computer 110-1 information 314 specifying configuration instructions and hyperparameters for a predetermined autoencoder neural network (ANN) 316. After receiving the configuration instructions and the hyperparameters, computation device 310 may implement the predetermined autoencoder neural network 316.

Moreover, computation device 310 may access in memory 312 information specifying tractography results (TR) 318 that specify a set of neurological fibers. After receiving tractography results 318, computation device 310 may compute 322, using the predetermined autoencoder neural network 316, second tractography 324 results that specify a second set of neurological fibers based at least in part on the tractography results 318 and information 320 associated with a neurological anatomical region (NAR), which may be accessed in memory 312.

After or while performing the computations, computation device 310 may store second tractography results 324 in memory 312. Alternatively or additionally, computation device 310 may provide instructions 326 to a display 328 in computer 110-1 to display the second tractography results 324. In some embodiments, computation device 310 may provide instructions 330 to an interface circuit 332 in computer 110-1 to provide the second tractography results 324 to another computer or electronic device (not shown).

While FIG. 3 illustrates communication between components using unidirectional or bidirectional communication with lines having single arrows or double arrows, in general the communication in a given operation in this figure may involve unidirectional or bidirectional communication.

Figure 4:
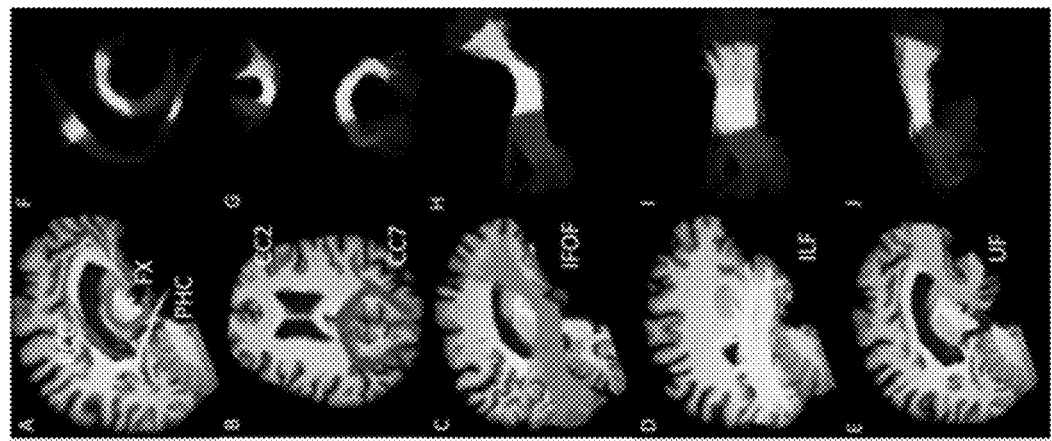
FIGS. 4-6 are drawing illustrating examples of tractography in accordance with an embodiment of the present disclosure.
Figure 4:
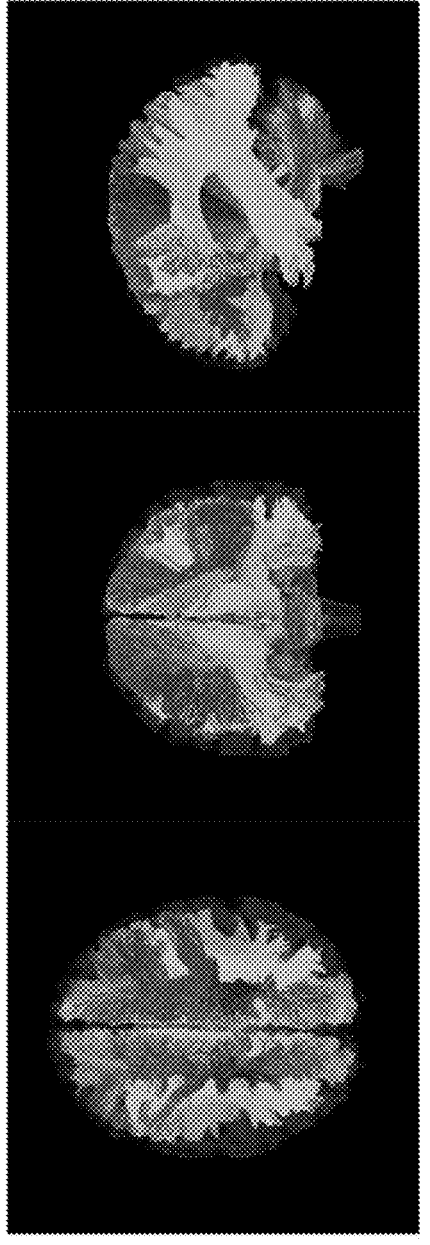
Figure 5:
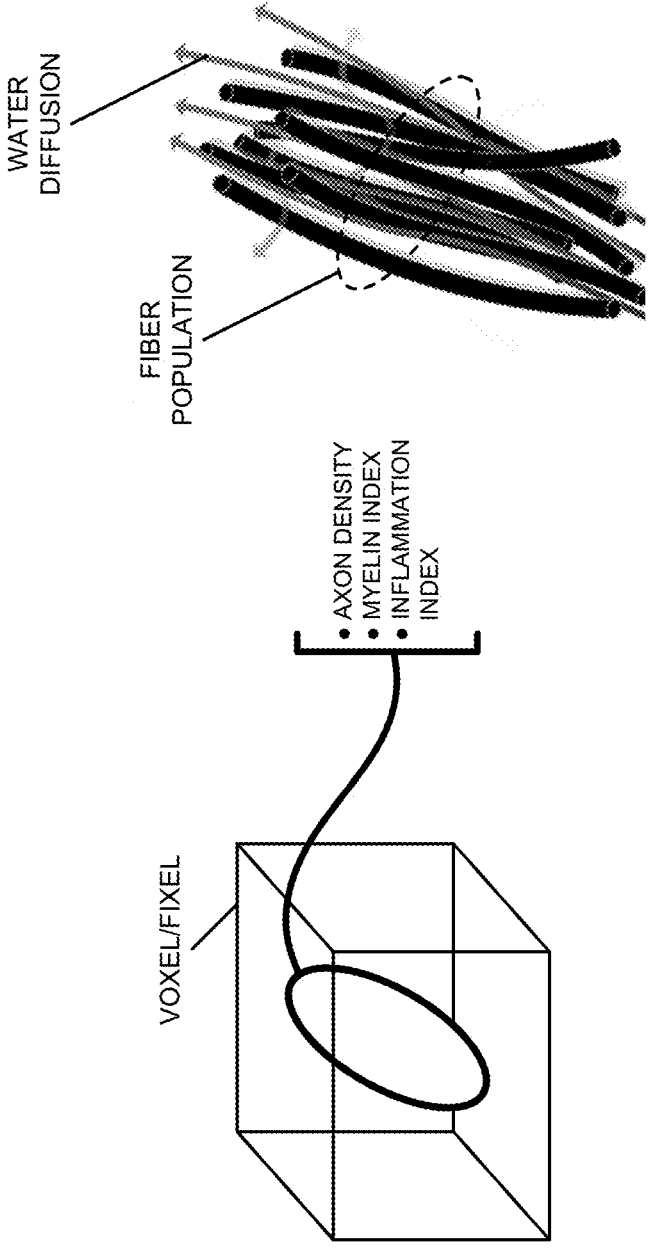
Figure 6:
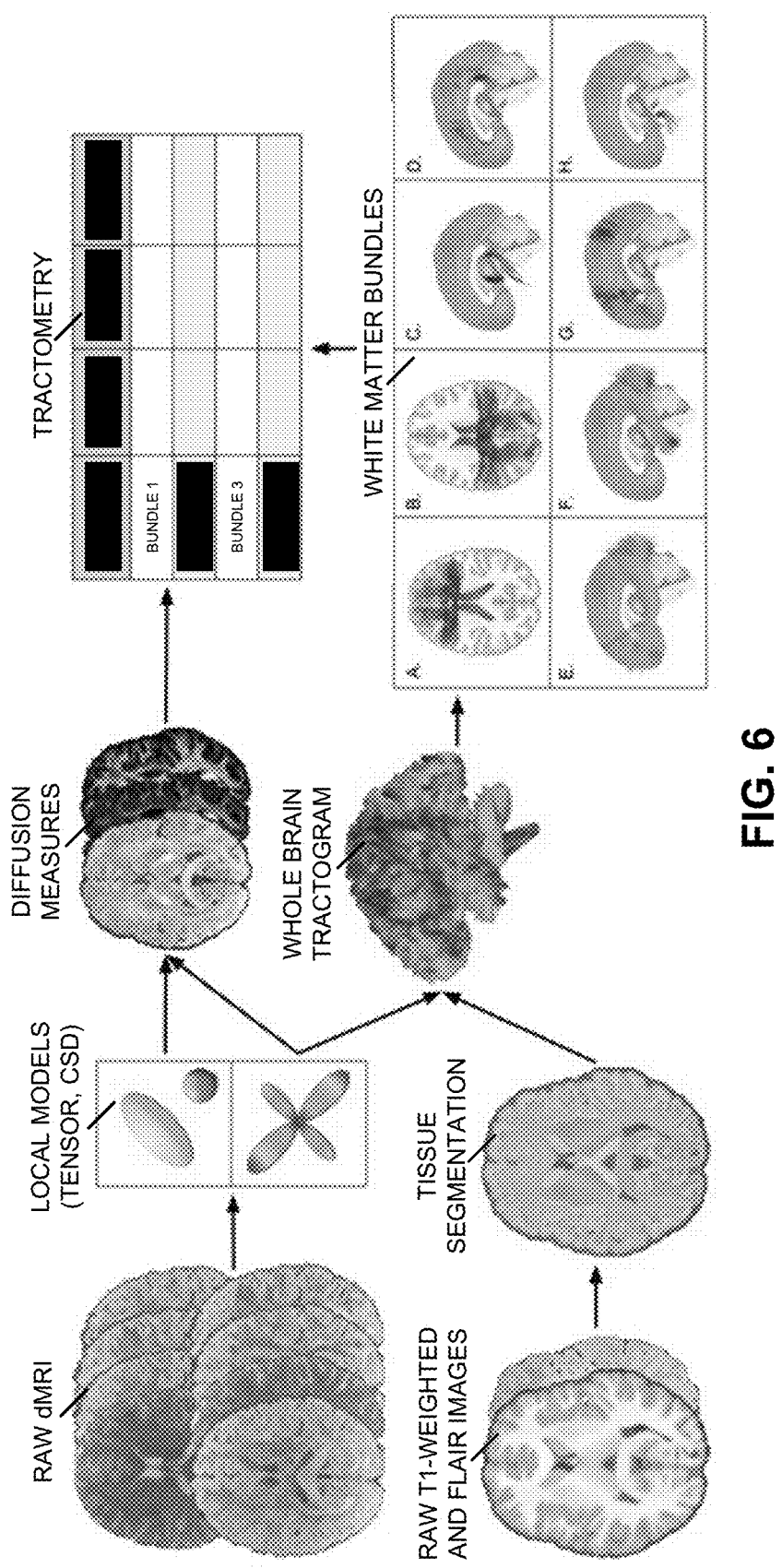

We now further describe embodiments of the analysis techniques. FIGS. 4-6 presents drawing illustrating examples of tractography. As shown in FIG. 5, tractography may involve a track-specific tissue assessment, and accurate tractography may enable assessment of one or more attributes or characteristics associated with the microstructure environment of each fiber population (such as an axon density index, a myelin index, an inflammation index, etc.).

Figure 7:
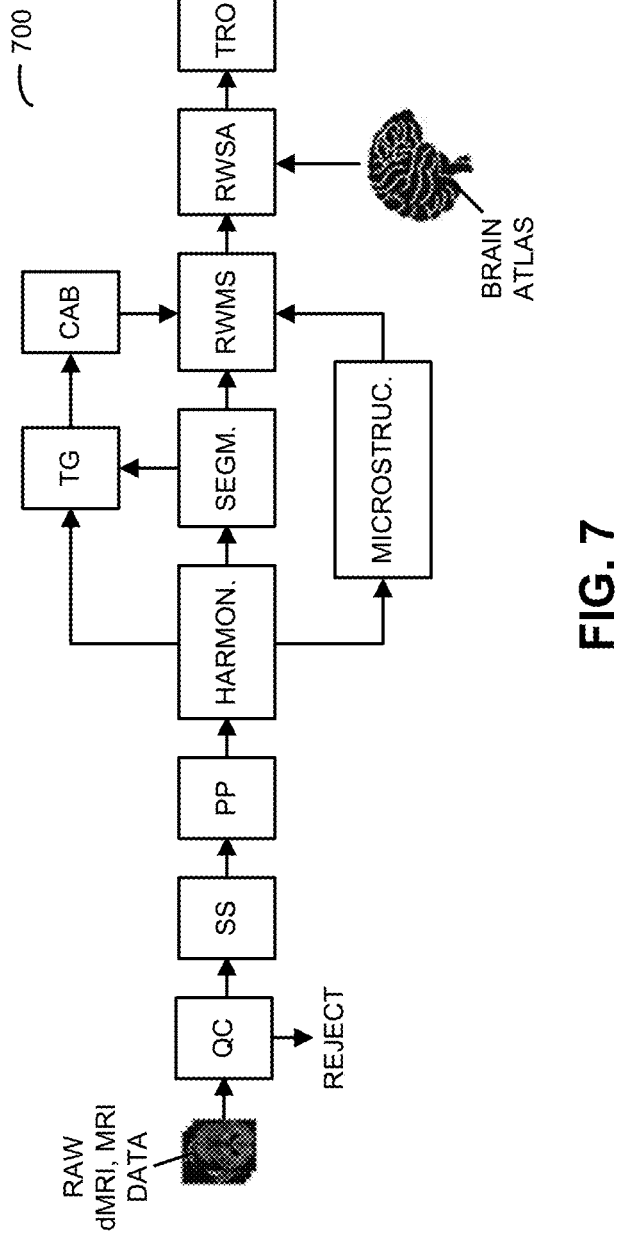
FIG. 7 is a drawing illustrating an example of analysis pipeline in accordance with an embodiment of the present disclosure.
Figure 8:
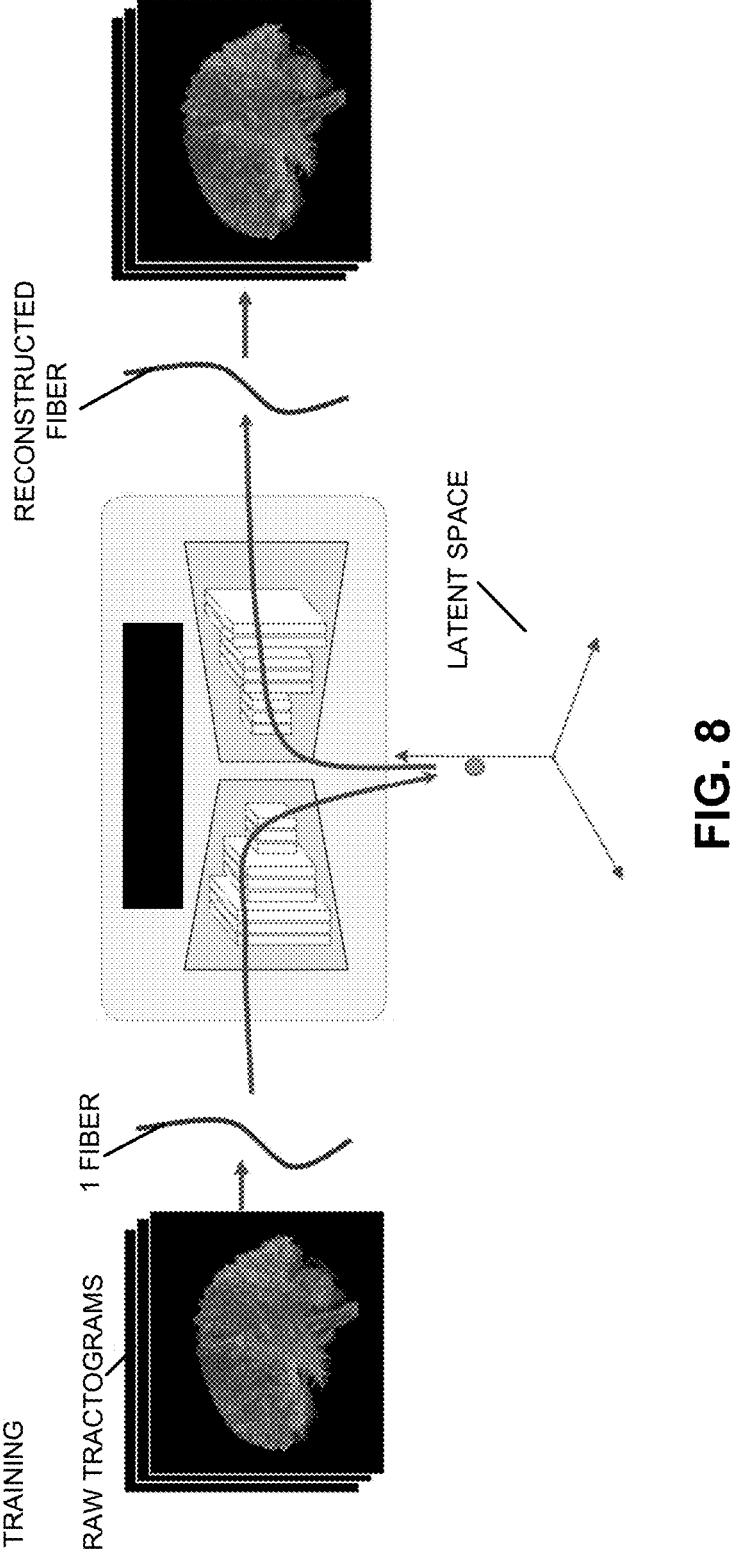

FIG. 7 is a drawing illustrating an example of analysis pipeline 700. As discussed previously, analysis pipeline 700 may include: quality control or QC (such as visual inspection, an image resolution check and/or a gradient distribution check), skull stripping or SS, preprocessing or PP (such as denoising, motion correction and/or a correction for magnetic field inhomogeneity), harmonization or HARMON (to correct for data variation, e.g., in dMRI and/or MRI data, associated with different MR scanners), tissue segmentation (e.g., white matter, grey matter, tumor, cerebrospinal fluid, etc., and which may be based at least in part on structural MRI data using a convolutional neural network), tractography or TG (using an autoencoder neural network, and which may include a clean and bundle or CAB operation), microstructure analysis, region-wise microstructure statistics (RWMS), region-wise statistical analysis (RWSA), and/or a diagnostic or treatment recommendation operation (TRO). In the case of analysis for an individual, region-wise statistical analysis may be based at least in part on a comparison with a reference atlas or data structure (such as a region-wise microstructure brain atlas corresponding to multiple individuals). Alternatively, in the case of analysis of a population, the decision or treatment recommendation operation may be computed based at least in part on cases and controls in the population.

Autoencoder neural networks are deep neural networks that may be able to learn an efficient representation of data in an unsupervised fashion using a dimensionality reduction approach. Autoencoder neural networks may be trained to reconstruct an input signal through a series of compressing operations (known as the encoder), followed by a series of decompression operations (referred to as the decoder). As shown in FIGS. 8-14, between the encoder and the decoder there is the so-called latent space, where each point is an encoded representation of an input data sample. As discussed previously, in the analysis techniques, the input data may be a streamline, which is a sequence of three-dimensional points. Notably, a streamline may be an ordered sequence of points $s=\{c_1, c_2, \ldots, c_n\}$, where $c_i$ is a real number in a 3D space, that represents a package of similarly oriented neurological fibers describing a neural pathway within the brain white matter. A tractogram representing a set of M streamlines may be expressed as $T=\{s_1, s_2, \ldots, s_m\}$.

Autoencoder neural networks may offer advantages over other types of neural networks. First, they may be trained using raw unlabeled data, which is an asset in the context of brain tractography. Second, because the latent representation may be obtained by a series of compressing operations, two neighboring points in the latent space may correspond to input data instances that share similar characteristics. Consequently, the encoded representation may be used to redefine the notion of inter-data distance. In the context of tractography, instead of measuring the distance between two streamlines with a geometric distance function, one can project the streamlines into the latent space and measure, e.g., their Euclidean distance.

Figure 9:
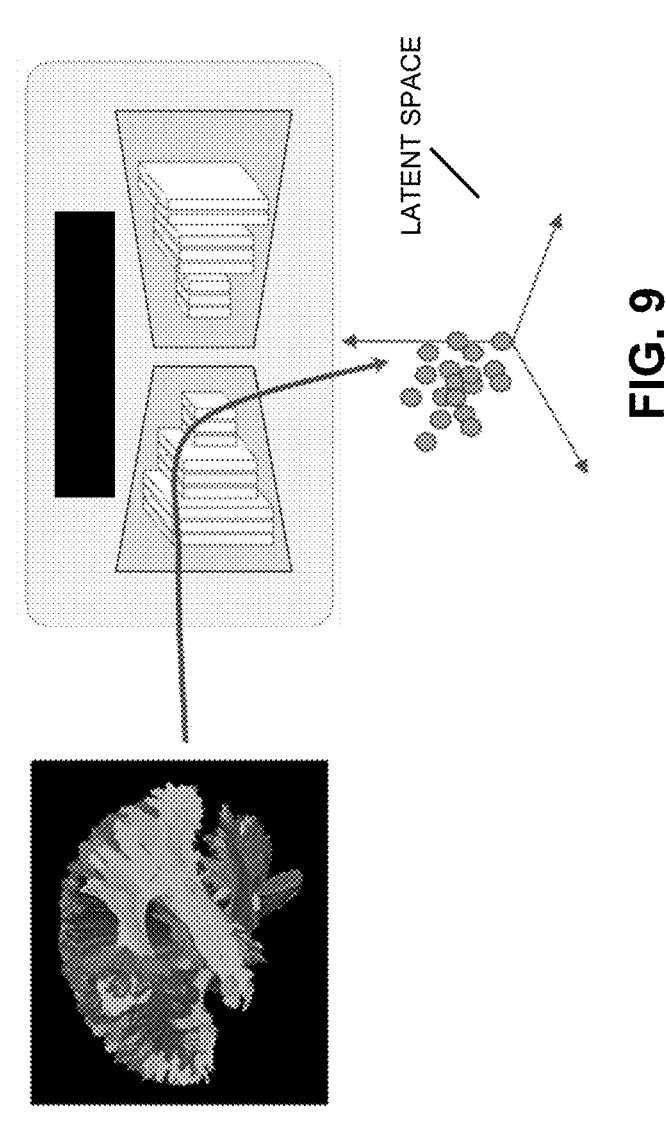
Figure 10:
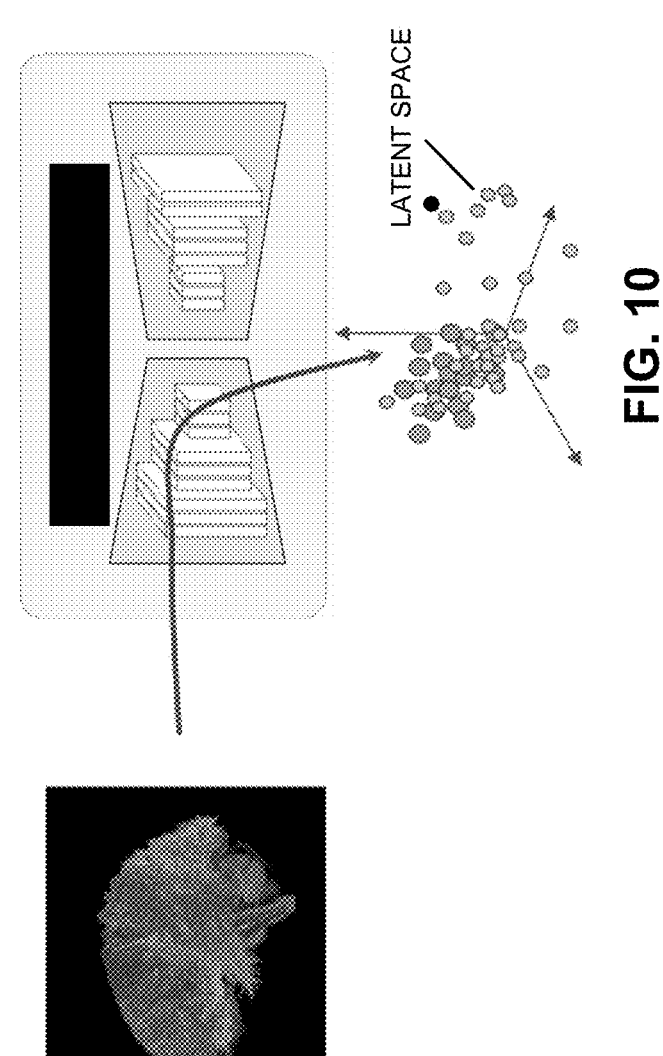
Figure 11:
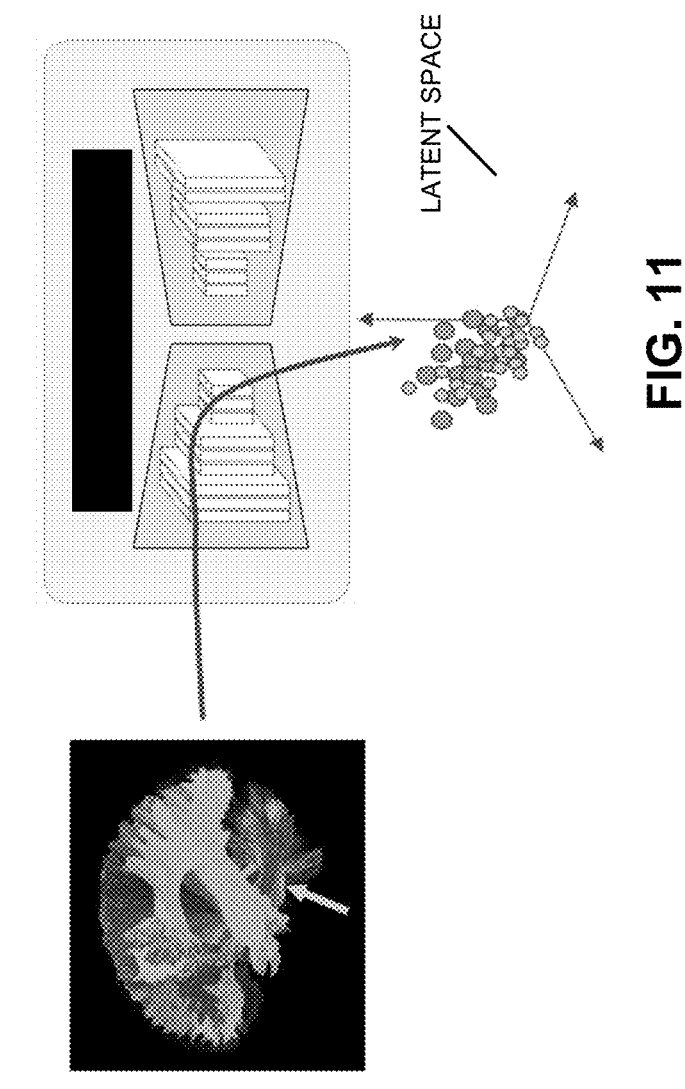
Figure 12:
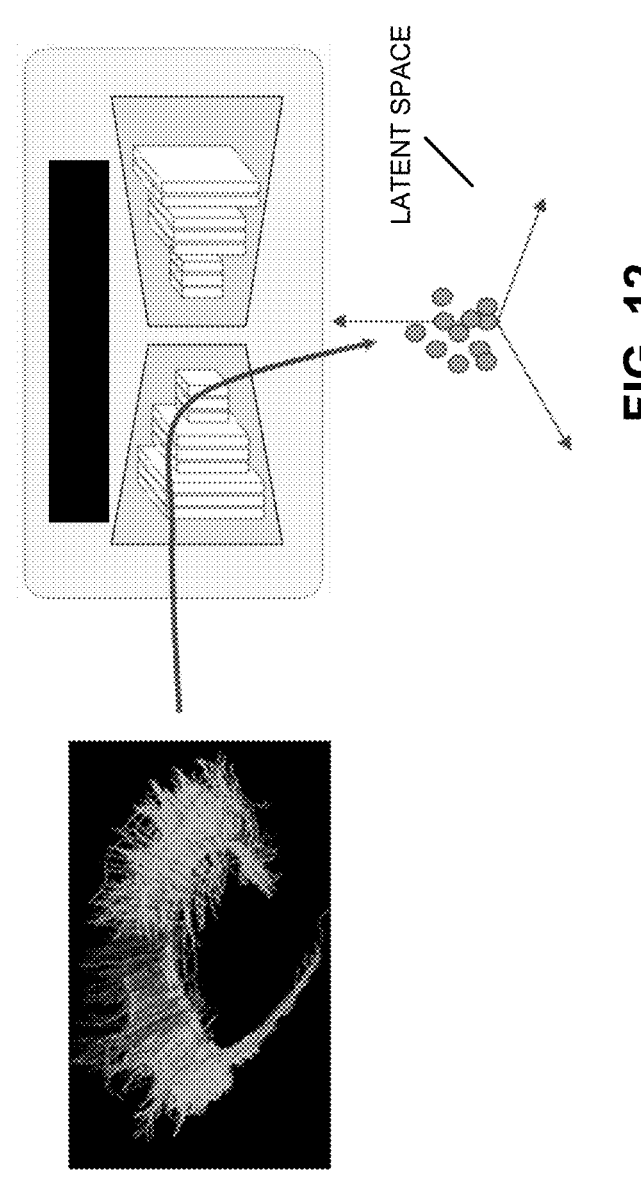
Figure 13:
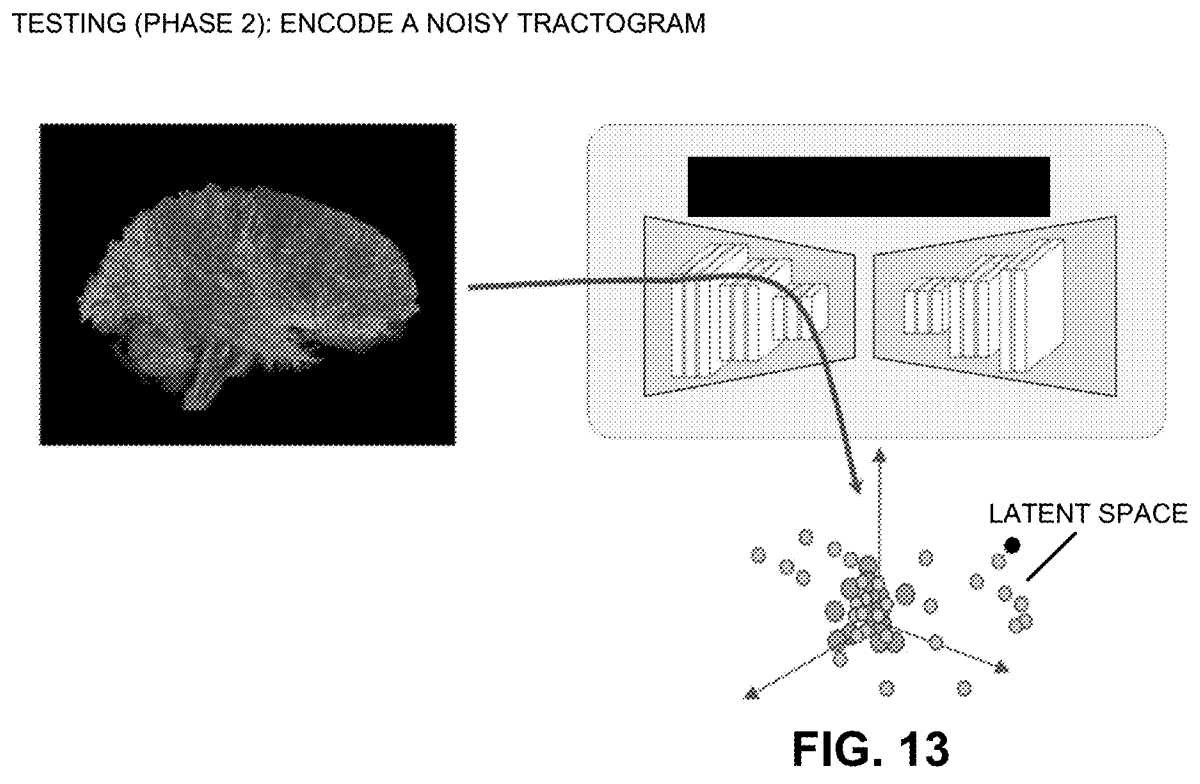
Figure 14:
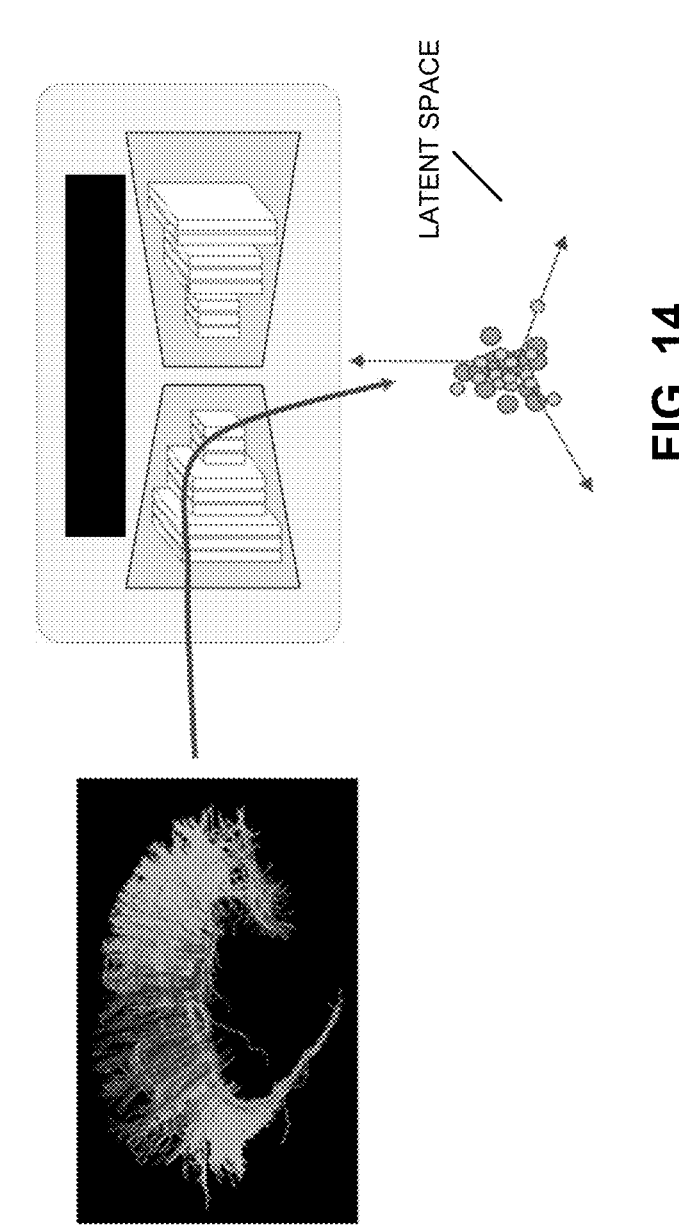

As shown in FIGS. 8-14, which present drawings illustrating examples of a cleaning and bundling operation, the disclosed analysis technique may include the following operations. First, an autoencoder neural network may be trained with a raw, uncurated tractogram. Based at least in part on the training tractogram, streamlines of interest may be labeled. These streamlines may be examples of anatomically plausible neurological fibers, streamlines representing neurological fibers belonging to predefined sets of bundles, or other streamlines that are of interest. Moreover, the streamlines may be labeled as positive streamlines. (Note that the autoencoder neural network may be trained in an unsupervised manner. However, the process of selecting the correct 'neurological' fibers, e.g., using a latent space and a nearest-neighbor technique, may use a target, such as labeled data.) Then, as shown in FIG. 9, the positive streamlines may be projected into the latent space with the encoder neural network. (In FIGS. 8-14, the latent vectors are illustrated by the circles.) Note that in case of more than two classes (such as for a multi-label bundling operation), streamlines of several classes may also be projected into the latent space. Next, as shown in FIGS. 10 and 11, given a new tractogram that is to be filtered, the streamlines of this tractogram are projected into the latent space and are labeled according to the distance to their nearest neighbor. Consequently, the filtering process in the disclosed analysis techniques may take place in the latent space.

In some embodiments, the nearest-neighbor discrimination may employ a latent-space distance cut-off value (which is sometimes referred to as a 'filtering threshold') relative to a (labeled) reference set of streamlines to discriminate the uncurated streamlines of a tractogram. The filtering threshold may represent a minimum distance at which a streamline is considered to be implausible, and its value may be computed on the separate reference set of streamlines. For example, the filtering threshold may be determined form an optimal point in a receiver operating characteristic (ROC) curves that evenly rewards true positives and penalizes false positives. Alternatively, the filtering threshold may be determined using data from a variety of tracking settings (e.g., probabilistic, deterministic, global, etc.) and datasets. Note that the filtering threshold may be, e.g., 6.568 or 13.634. However, in general the filtering threshold may be tailored or selected for a particular dataset being analyzed.

Moreover, the autoencoder neural network may be a fully convolutional neural network whose overall structure is summarized in Table 1. This autoencoder neural network may accept a streamline at its input. Because raw streamlines have a different number of vertices (long streamlines have more vertices than shorter ones), in the analysis techniques streamlines may be resampled so that they have an equal number of vertices (e.g. 256 in Table 1). Note that the latent space length may be fixed at, e.g., a value smaller than 512, such as 32. However, other values may be used.

TABLE 1

| Part | Type | Features | Size |
|---|---|---|---|
| Input | | | 3; 256 |
| Encoder | ID convolution | 32 | 256 |
| | ID convolution | 64 | 128 |
| | ID convolution | 128 | 64 |
| | ID convolution | 256 | 32 |
| | ID convolution | 512 | 16 |
| | ID convolution | 1024 | 8 |
| Latent Space | Fully Connected | 32 | |
| Decoder | Upsampling + ID convolution | 1024 | 8 |
| | Upsampling + ID convolution | 512 | 16 |
| | Upsampling + ID convolution | 256 | 32 |
| | Upsampling + ID convolution | 128 | 64 |
| | Upsampling + ID convolution | 64 | 128 |
| | Upsampling + ID convolution | 32 | 256 |
| Output | | | 3; 256 |

Furthermore, the autoencoder may be trained with an Adam optimizer with a mean squared-error loss. The hyperparameters may be adjusted using a Bayesian search technique. The learning rate of the optimizer may be fixed to a value of $6.68 \times 10^{-4}$, and weight decaying regularization with a 0.13 valued parameter may be used. Note that Table 1 provides an example of an autoencoder neural network structure. The encoder neural network may use strides of size 2, and the decoder neural network may use strides of size 1. Additionally, the upsampling stages in the decoder neural network may use an upsampling factor of 2. The autoencoder neural network may use ReLU activations throughout its convolutional layers.

Note that latent space of the autoencoder neural network may allow the streamline pair-wise distance to be reinterpreted. Notably, the analysis techniques may use the Euclidean distance between the latent representation of two streamlines as a proxy to measure their structural similarity. However, in other embodiments, a different similarity metric may be used, such as a Manhattan distance.

Figure 15:
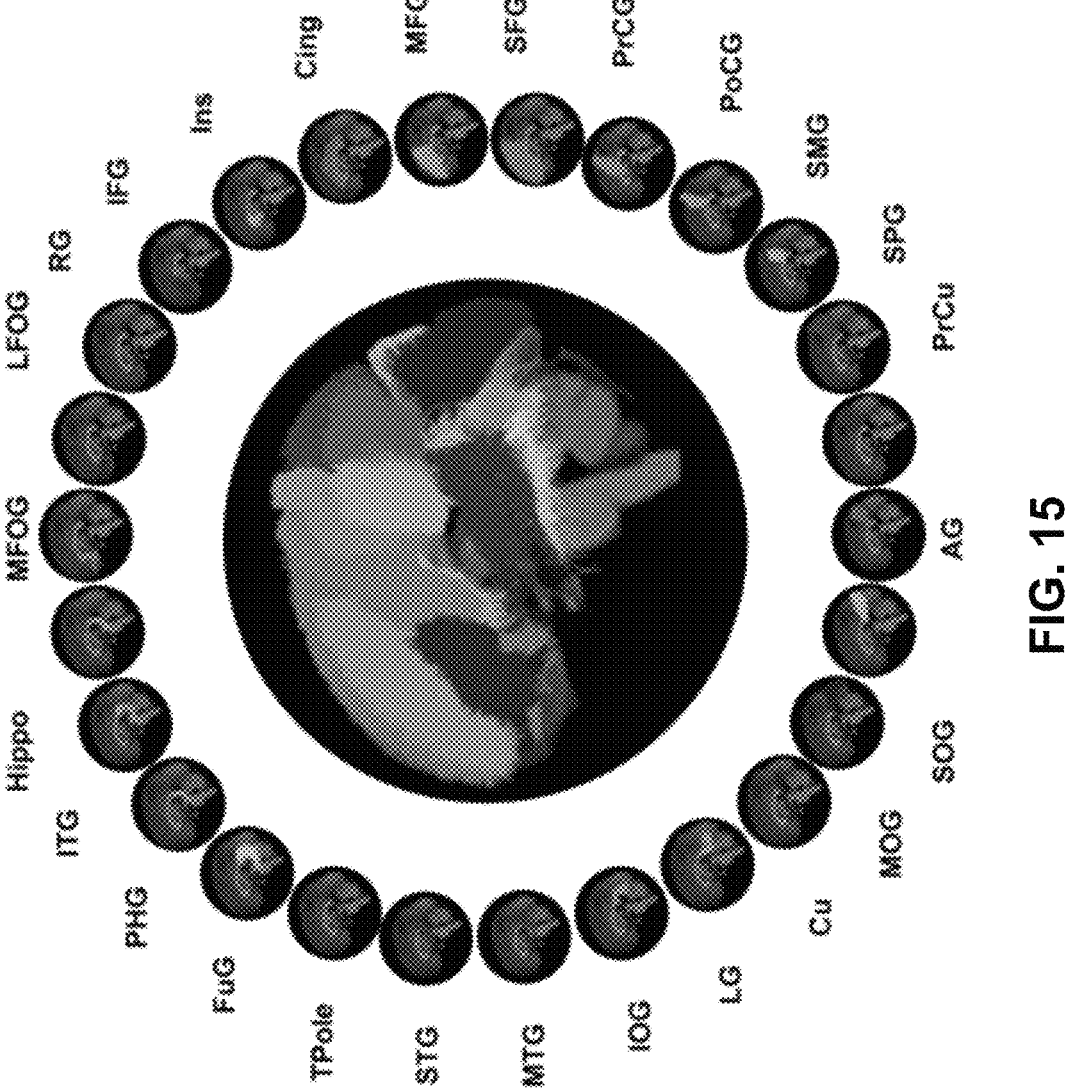
FIG. 15 is a drawing illustrating an example of bundling results in different neurological anatomical regions in accordance with an embodiment of the present disclosure.

FIG. 15 presents a drawing illustrating an example of bundling results in different neurological anatomical regions.

In contrast with existing filtering techniques that assume that the estimated streamline population at every voxel is proportionally supported by the diffusion data, the disclosed autoencoder neural network may work on tracking data only. This may make the analysis techniques less sensitive to or immune against domain adaptation issues. Furthermore, in comparison with a quadratic or super-quadratic complexity of some existing filtering techniques, the disclosed analysis techniques may be linear in terms of the streamline count at test time.

Additionally, compared to other deep learning techniques that may be specifically oriented to classification tasks (e.g., regular classification convolutional neural networks), the disclosed analysis techniques may provide the benefit of using an unsupervised learning approach. Thus, the disclosed analysis techniques may not depend on the number of classes in the input data as the output of the network does not look for maximizing the probability of a given class among the possible ones. Consequently, the disclosed analysis techniques may be better suited to the reality of tractography, where there is a limited knowledge about the ground truth, and where the analysis may lend itself to different organizational levels and, thus, different classification degrees. Therefore, the disclosed analysis techniques may naturally adapt to new sets of classes without the need of having to retrain the autoencoder neural network.

A potential side-benefit of the disclosed analysis techniques is that the reconstructed streamlines describe a locally smooth (yet 'denoised') trajectory. Succeeding analysis pipeline or visualization processes may benefit from this attribute, thereby providing a less complicated or a more realistic long-range apparent fiber trajectory representation.

In some embodiments, downstream tractography tasks may benefit from filtering strategies applied at earlier stages when performed in a coherent manner. For example, one of such tasks is the structural connectivity analysis (or connectomics). Because the disclosed analysis techniques more accurately reject implausible streamlines, they may preserve the existing connectivity. Consequently, the disclosed analysis techniques may regenerate the connectome to a high degree of accuracy.

Moreover, the disclosed analysis techniques may be robust across a varying spectrum of settings. The disclosed analysis techniques assume that, provided that the implausible streamlines have overall distinctive features from the plausible ones, they may be cast to different regions in the latent space, and thus the filtering framework may be able to separate them, regardless of their location and arrangement in the native space or within-fascicle balance. Similarly, the autoencoder neural network may have the ability to disentangle a varying number of bundles or streamline groups. Note that the disclosed analysis techniques may be used with datasets having a wide range of values for a ratio of plausible streamlines to implausible streamlines, such as between 5-70.

In some embodiments, the computer system may use an analysis model that is pretrained or predetermined using a machine-learning technique (such as a supervised learning technique, an unsupervised learning technique and/or a neural network) and a training dataset. For example, the analysis model may include a classifier or a regression model that was trained using: a support vector machine technique, a classification and regression tree technique, logistic regression, LASSO, linear regression, a neural network technique (such as a convolutional neural network technique, an autoencoder neural network or another type of neural network technique) and/or another linear or nonlinear supervised-learning technique.

Figure 16:
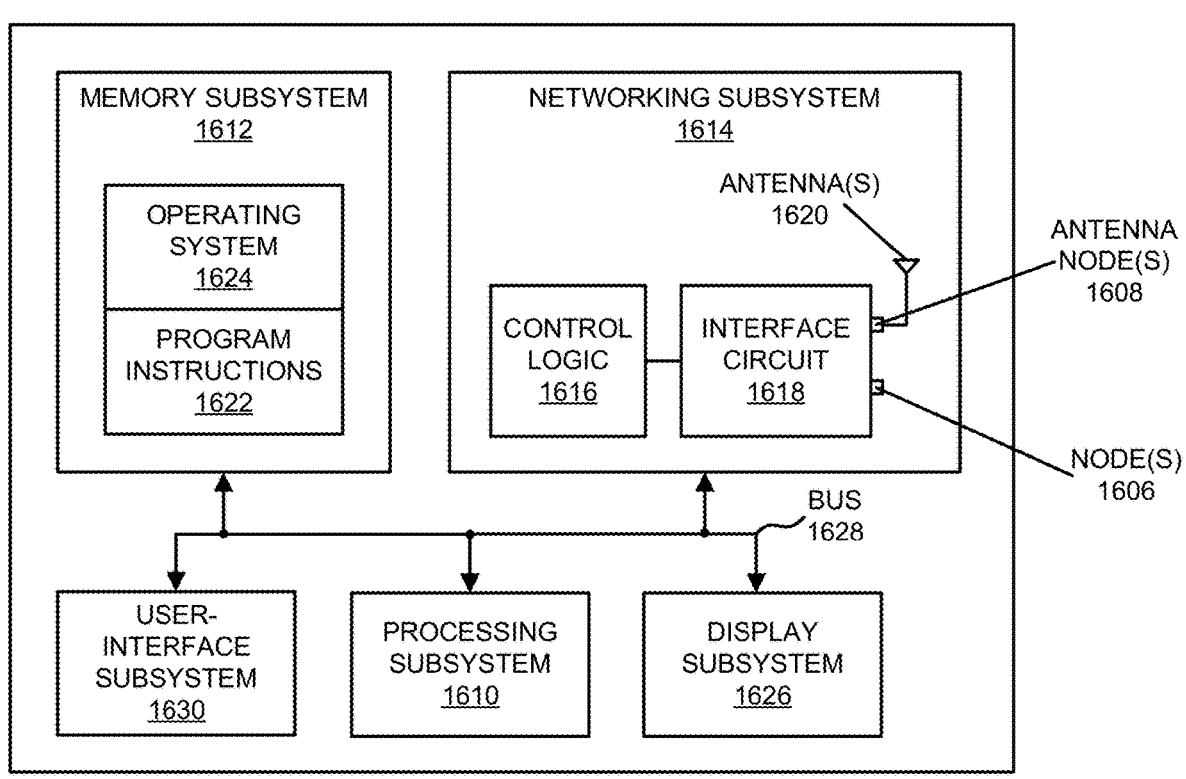
FIG. 16 is a block diagram illustrating an example of a computer in accordance with an embodiment of the present disclosure.

We now describe embodiments of a computer, which may perform at least some of the operations in the analysis techniques. FIG. 16 presents a block diagram illustrating an example of a computer 1600, e.g., in a computer system (such as computer system 100 in FIG. 1), in accordance with some embodiments. For example, computer 1600 may include: one of computers 110. This computer may include processing subsystem 1610, memory subsystem 1612, and networking subsystem 1614. Processing subsystem 1610 includes one or more devices configured to perform computational operations. For example, processing subsystem 1610 can include one or more microprocessors, ASICs, microcontrollers, programmable-logic devices, GPUs and/or one or more DSPs. Note that a given component in processing subsystem 1610 are sometimes referred to as a 'computation device'.

Memory subsystem 1612 includes one or more devices for storing data and/or instructions for processing subsystem 1610 and networking subsystem 1614. For example, memory subsystem 1612 can include dynamic random access memory (DRAM), static random access memory (SRAM), and/or other types of memory. In some embodiments, instructions for processing subsystem 1610 in memory subsystem 1612 include: program instructions or sets of instructions (such as program instructions 1622 or operating system 1624), which may be executed by processing subsystem 1610. Note that the one or more computer programs or program instructions may constitute a computer-program mechanism. Moreover, instructions in the various program instructions in memory subsystem 1612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1610.

In addition, memory subsystem 1612 can include mechanisms for controlling access to the memory. In some embodiments, memory subsystem 1612 includes a memory hierarchy that comprises one or more caches coupled to a memory in computer 1600. In some of these embodiments, one or more of the caches is located in processing subsystem 1610.

In some embodiments, memory subsystem 1612 is coupled to one or more high-capacity mass-storage devices (not shown). For example, memory subsystem 1612 can be coupled to a magnetic or optical drive, a solid-state drive, or another type of mass-storage device. In these embodiments, memory subsystem 1612 can be used by computer 1600 as fast-access storage for often-used data, while the mass-storage device is used to store less frequently used data.

Networking subsystem 1614 includes one or more devices configured to couple to and communicate on a wired and/or wireless network (i.e., to perform network operations), including: control logic 1616, an interface circuit 1618 and one or more antennas 1620 (or antenna elements). (While FIG. 16 includes one or more antennas 1620, in some embodiments computer 1600 includes one or more nodes, such as antenna nodes 1608, e.g., a metal pad or a connector, which can be coupled to the one or more antennas 1620, or nodes 1606, which can be coupled to a wired or optical connection or link. Thus, computer 1600 may or may not include the one or more antennas 1620. Note that the one or more nodes 1606 and/or antenna nodes 1608 may constitute input(s) to and/or output(s) from computer 1600.) For example, networking subsystem 1614 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 1614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, computer 1600 may use the mechanisms in networking subsystem 1614 for performing simple wireless communication between electronic devices, e.g., transmitting advertising or beacon frames and/or scanning for advertising frames transmitted by other electronic devices.

Within computer 1600, processing subsystem 1610, memory subsystem 1612, and networking subsystem 1614 are coupled together using bus 1628. Bus 1628 may include an electrical, optical, and/or electro-optical connection that the subsystems can use to communicate commands and data among one another. Although only one bus 1628 is shown for clarity, different embodiments can include a different number or configuration of electrical, optical, and/or electro-optical connections among the subsystems.

In some embodiments, computer 1600 includes a display subsystem 1626 for displaying information on a display, which may include a display driver and the display, such as a liquid-crystal display, a multi-touch touchscreen, etc. Moreover, computer 1600 may include a user-interface subsystem 1630, such as: a mouse, a keyboard, a trackpad, a stylus, a voice-recognition interface, and/or another human-machine interface.

Computer 1600 can be (or can be included in) any electronic device with at least one network interface. For example, computer 1600 can be (or can be included in): a desktop computer, a laptop computer, a subnotebook/net-book, a server, a supercomputer, a tablet computer, a smart-phone, a cellular telephone, a consumer-electronic device, a portable computing device, communication equipment, and/or another electronic device.

Although specific components are used to describe computer 1600, in alternative embodiments, different components and/or subsystems may be present in computer 1600. For example, computer 1600 may include one or more additional processing subsystems, memory subsystems, networking subsystems, and/or display subsystems. Additionally, one or more of the subsystems may not be present in computer 1600. Moreover, in some embodiments, computer 1600 may include one or more additional subsystems that are not shown in FIG. 16. Also, although separate subsystems are shown in FIG. 16, in some embodiments some or all of a given subsystem or component can be integrated into one or more of the other subsystems or component(s) in computer 1600. For example, in some embodiments program instructions 1622 are included in operating system 1624 and/or control logic 1616 is included in interface circuit 1618.

Moreover, the circuits and components in computer 1600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 1614 and/or computer 1600. The integrated circuit may include hardware and/or software mechanisms that are used for transmitting signals from computer 1600 and receiving signals at computer 1600 from other electronic devices. Aside from the mechanisms herein described, radios are generally known in the art and hence are not described in detail. In general, networking subsystem 1614 and/or the integrated circuit may include one or more radios.

In some embodiments, an output of a process for designing the integrated circuit, or a portion of the integrated circuit, which includes one or more of the circuits described herein may be a computer-readable medium such as, for example, a magnetic tape or an optical or magnetic disk or solid state disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OA-SIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While some of the operations in the preceding embodiments were implemented in hardware or software, in general the operations in the preceding embodiments can be implemented in a wide variety of configurations and architectures.

Therefore, some or all of the operations in the preceding embodiments may be performed in hardware, in software or both. For example, at least some of the operations in the analysis techniques may be implemented using program instructions 1622, operating system 1624 (such as a driver for interface circuit 1618) or in firmware in interface circuit 1618. Thus, the analysis techniques may be implemented at runtime of program instructions 1622. Alternatively or additionally, at least some of the operations in the analysis techniques may be implemented in a physical layer, such as hardware in interface circuit 1618.

In the preceding description, we refer to 'some embodiments'. Note that 'some embodiments' describes a subset of all of the possible embodiments, but does not always specify the same subset of embodiments. Moreover, note that the numerical values provided are intended as illustrations of the analysis techniques. In other embodiments, the numerical values can be modified or changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer system, comprising:
a computation device;
memory configured to store program instructions, wherein, when executed by the computation device, the program instructions cause the computer system to perform one or more operations comprising:
receiving information specifying tractography results that specify a set of neurological fibers associated with one or more individuals;
projecting the tractography results into a latent space using an encoder of a predetermined autoencoder neural network;
within the latent space, filtering out the projected tractography results outside of a predefined neurological anatomical region; and
computing, using a decoder in the predetermined autoencoder neural network, second tractography results that specify a second set of neurological fibers associated with the one or more individuals based at least in part on the filtered tractography results.

2. The computer system of claim 1, wherein the tractography results are associated with magnetic-resonance images of the one or more individuals.

3. The computer system of claim 1, wherein a subset of the set of neurological fibers are anatomically implausible and the second set of fibers excludes the subset.

4. The computer system of claim 1, wherein the second set of neurological fibers is, at least in part, different from the set of neurological fibers.

5. The computer system of claim 1, wherein the receiving comprises accessing the information in the memory.

6. The computer system of claim 1, wherein the predetermined auto-encoded neural network is configured to identify different types of bundles of neurological fibers; and wherein the different types of bundles of neurological fibers comprise different integer numbers of neurological fibers.

7. The computer system of claim 6, wherein the identifying comprises one of: discarding one or more neurological fibers in the set of neurological fibers; or classifying the one or more neurological fibers as a given type of bundle of neurological fibers comprising an integer number of neurological fibers.

8. The computer system of claim 1, wherein the computing comprises filtering and grouping the second set of neurological fibers from the set of neurological fibers based at least in part on the information associated with the predefined neurological anatomical region.

9. The computer system of claim 8, wherein the filtering comprises classifying one or more neurological fibers as a type of bundle of neurological fibers comprising an integer number of neurological fibers.

10. The computer system of claim 1, wherein the computing comprises:

transforming the set of neurological fibers to the latent space having a smaller number of dimensions than the set of neurological fibers; and classifying one or more neurological fibers as a type of bundle of neurological fibers comprising an integer number of neurological fibers based at least in part on a classification technique and a reference space encoded in the latent space that corresponds to the information associated with the neurological anatomical region; and wherein the reference space specifies different types of bundles of neurological fibers comprising different integer numbers of neurological fibers.

11. The computer system of claim 10, wherein the classification technique comprises: a K nearest-neighbors technique, where K is a non-zero integer; a generative model; a Fisher discriminator; a kernel method; a decision tree; a random forest; a linear perceptron; or a multi-layer neural network.

12. The computer system of claim 10, wherein the operations comprise:

sampling the latent space based at least in part on a sampling technique; and generating neurological fibers in the second set of neurological fibers based at least in part on the sampled latent space.

13. The computer system of claim 1, wherein the predetermined autoencoder neural network comprises an encoder neural network and a decoder neural network;

wherein a given neural network in the predetermined autoencoder neural network comprises one or more convolutional layers, one or more residual layers and one or more dense layers; and wherein a given node in a given layer in the given neural network comprises an activation function, and the activation function comprises a rectified linear activation function (ReLU), a leaky ReLU, an exponential linear unit (ELU) activation function, a parametric ReLU, a tanh activation function, or a sigmoid activation function.

14. A non-transitory computer-readable storage medium for use in conjunction with a computer system, the computer-readable storage medium configured to store program instructions that, when executed by the computer system, causes the computer system to perform one or more operations comprising:

receiving information specifying tractography results that specify a set of neurological fibers associated with one or more individuals;

projecting the tractography results into a latent space using an encoder of a predetermined autoencoder neural network;

within the latent space, filtering out the projected tractography results outside of a predefined neurological anatomical region; and computing, using a decoder in the predetermined autoencoder neural network, second tractography results that specify a second set of neurological fibers associated with the one or more individuals based at least in part on the filtered tractography results.

15. The non-transitory computer-readable storage medium of claim 14, wherein the predetermined auto-encoded neural network is configured to identify different types of bundles of neurological fibers; and wherein the different types of bundles of neurological fibers comprise different integer numbers of neurological fibers.

16. The non-transitory computer-readable storage medium of claim 14, wherein the computing comprises filtering and grouping the second set of neurological fibers from the set of neurological fibers based at least in part on the information associated with the neurological anatomical region.

17. The non-transitory computer-readable storage medium of claim 16, wherein the filtering comprises classifying one or more neurological fibers as a type of bundle of neurological fibers comprising an integer number of neurological fibers.

18. The non-transitory computer-readable storage medium of claim 14, wherein the computing comprises:

transforming the set of neurological fibers to the latent space having a smaller number of dimensions than the set of neurological fibers; and classifying one or more neurological fibers as a type of bundle of neurological fibers comprising an integer number of neurological fibers based at least in part on a nearest-neighbors technique and a reference space encoded in the latent space that corresponds to the information associated with the neurological anatomical region; and wherein the reference space specifies different types of bundles of neurological fibers comprising different integer numbers of neurological fibers.

19. A method for computing second tractography results, comprising:

by a computer system:

receiving information specifying tractography results that specify a set of neurological fibers associated with one or more individuals;

projecting the tractography results into a latent space using an encoder of a predetermined autoencoder neural network;

within the latent space, filtering out the projected tractography results outside of a predefined neurological anatomical region; and computing, using a decoder in the predetermined autoencoder neural network, second tractography results that specify a second set of neurological fibers associated with the one or more individuals based at least in part on the filtered tractography results.

20. The method of claim 19, wherein the predetermined auto-encoded neural network identifies different types of bundles of neurological fibers; and wherein the different types of bundles of neurological fibers comprise different integer numbers of neurological fibers.

21. The computer system of claim 1, wherein the predetermined autoencoder neural network is configured to transform the tractography results to the latent space corresponding to the predefined neurological anatomical region.

\*    \*    \*    \*    \*